United States Patent
Yang

(10) Patent No.: US 7,068,417 B2
(45) Date of Patent: Jun. 27, 2006

(54) METHOD AND APPARATUS FOR A REFLECTIVE SPATIAL LIGHT MODULATOR WITH A FLEXIBLE PEDESTAL

(75) Inventor: Xiao Yang, Cupertino, CA (US)

(73) Assignee: Miradia Inc., Sunnyvale, CA (US)

( * ) Notice: Subject to any disclaimer, the term of this patent is extended or adjusted under 35 U.S.C. 154(b) by 0 days.

(21) Appl. No.: 10/901,706

(22) Filed: Jul. 28, 2004

(65) Prior Publication Data

US 2006/0023286 A1   Feb. 2, 2006

(51) Int. Cl.
G02B 26/00   (2006.01)

(52) U.S. Cl. ..................................... 359/291

(58) Field of Classification Search ................ 359/291, 359/290, 292, 293, 295, 223, 224, 320, 322
See application file for complete search history.

(56) References Cited

U.S. PATENT DOCUMENTS

| | | |
|---|---|---|
| 4,229,732 A | 10/1980 | Hartstein et al. |
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,172,262 A | 12/1992 | Hornbeck |
| 5,311,360 A | 5/1994 | Bloom et al. |
| 5,382,961 A | 1/1995 | Gale, Jr. |
| 5,448,314 A | 9/1995 | Heimbuch et al. |
| 5,452,024 A | 9/1995 | Sampsell |
| 5,489,952 A | 2/1996 | Gove et al. |
| 5,504,614 A | 4/1996 | Webb et al. |
| 5,535,047 A | 7/1996 | Hornbeck |
| 5,583,688 A | 12/1996 | Hornbeck |
| 5,589,852 A | 12/1996 | Thompson et al. |
| 5,600,363 A | 2/1997 | Hornbeck |
| 5,600,383 A | 2/1997 | Hornbeck |
| 5,661,591 A | 8/1997 | Lin et al. |
| 5,663,749 A | 9/1997 | Fams et al. |
| 5,742,419 A | 4/1998 | Dickensheets et al. |
| 5,757,536 A | 5/1998 | Rioco et al. |
| 5,793,519 A | 8/1998 | Furlani et al. |
| 5,835,256 A | 11/1998 | Huibers |

(Continued)

OTHER PUBLICATIONS

Henley et al., "A New SOI Manufacturing Technology Using Atomic layer Cleaving." Silicon Genesis Corporation Campbell CA. pp. 1-5.

(Continued)

Primary Examiner—Hung Xuan Dang
Assistant Examiner—Tuyen Tra
(74) Attorney, Agent, or Firm—Townsend and Townsend and Crew LLP

(57) ABSTRACT

An electro-mechanical system comprising a substrate including a surface region and a flexible member coupled at a first end to the surface region. The system further comprises a base region within a first portion of the flexible member and a tip region within a second portion of the flexible member. The system also comprises a reflective member coupled to the flexible member, including a reflective surface and a backside region, the backside region being coupled to the second end of the flexible member, the reflective surface being substantially parallel to the surface region while the reflective member is in a first state and being substantially non-parallel to the surface region while the reflective member is in a second state, whereupon the flexible member moves from a first position characterized by the first state to a second position characterized by the second state.

22 Claims, 7 Drawing Sheets

U.S. PATENT DOCUMENTS

| | | | |
|---|---|---|---|
| 5,885,468 A | 3/1999 | Kozlowski | |
| 5,939,171 A | 8/1999 | Biebl | |
| 5,999,306 A | 12/1999 | Atobe et al. | |
| 6,038,056 A | 3/2000 | Florence et al. | |
| 6,046,840 A | 4/2000 | Huibers | |
| 6,049,317 A | 4/2000 | Thompson et al. | |
| 6,127,756 A | 10/2000 | Iwaki et al. | |
| 6,172,797 B1 | 1/2001 | Huibers | |
| 6,201,521 B1 | 3/2001 | Doherty | |
| 6,252,277 B1 | 6/2001 | Chan et al. | |
| 6,285,490 B1 | 9/2001 | Meier et al. | |
| 6,323,982 B1 | 11/2001 | Hornbeck | |
| 6,337,760 B1 | 1/2002 | Huibers et al. | |
| 6,356,378 B1 | 3/2002 | Huibers | |
| 6,386,661 B1 | 5/2002 | Richards | |
| 6,396,619 B1 | 5/2002 | Huibers et al. | |
| 6,429,033 B1 | 8/2002 | Gee et al. | |
| 6,529,310 B1 | 3/2003 | Huibers et al. | |
| 6,538,800 B1 | 3/2003 | Huibers | |
| 6,542,653 B1 | 4/2003 | Wu et al. | |
| 6,543,286 B1 | 4/2003 | Garverick et al. | |
| 6,809,852 B1 | 10/2004 | Tao et al. | |
| 6,820,988 B1 | 11/2004 | van Drieenhuizen | |
| 6,827,866 B1 | 12/2004 | Novotny | |
| 6,856,068 B1 | 2/2005 | Miller et al. | |
| 6,891,654 B1 * | 5/2005 | Kurosawa et al. | 359/291 |
| 6,891,655 B1 * | 5/2005 | Grebinski et al. | 359/291 |
| 2002/0041455 A1 | 4/2002 | Sawada et al. | |
| 2002/0071166 A1 | 6/2002 | Jin et al. | |
| 2002/0071169 A1 | 6/2002 | Bowers et al. | |
| 2002/0132389 A1 | 9/2002 | Patel et al. | |
| 2003/0117686 A1 | 6/2003 | DiCarlo | |
| 2003/0207487 A1 | 11/2003 | Kubena et al. | |
| 2004/0000696 A1 | 1/2004 | Ma et al. | |
| 2004/0004753 A1 | 1/2004 | Pan | |
| 2004/0008402 A1 | 1/2004 | Patel et al. | |
| 2004/0125347 A1 | 7/2004 | Patel et al. | |
| 2004/0136044 A1 | 7/2004 | Miller et al. | |
| 2004/0184133 A1 | 9/2004 | Su et al. | |
| 2004/0190817 A1 | 9/2004 | Aubuchon | |
| 2005/0041277 A1 | 2/2005 | Huibers | |

OTHER PUBLICATIONS

Petersen, K.E., Micromechanical Light Modulator Array Fabricated On Silicon. Applied Physics Letters. Oct. 15, 1977, pp. 521-523, vol. 31 No. 8.

Petersen, K.E., Micromechanical Membrane Switches On Silicon. IBM J. Res. Develop., Jul. 1979, pp. 376-385. vol. 23, No. 4.

* cited by examiner

METHOD AND APPARATUS FOR A REFLECTIVE SPATIAL LIGHT MODULATOR WITH A FLEXIBLE PEDESTAL

BACKGROUND OF THE INVENTION

This present invention relates generally to manufacturing objects. More particularly, the invention provides a method and apparatus for fabricating and operating electro-mechanical systems. Merely by way of example, the invention has been applied to a high fill factor micro-electro-mechanical mirror array with a hidden, flexible support pedestal. The method and apparatus can be applied to other electro-mechanical technology as well, including actuators and sensors.

Micro-electromechanical systems (MEMS) are used in a number of application areas. For example, MEMS have been used in micro-mirror arrays, sensors, and actuators. In some of these applications, a suspended member is supported by a flexible hinge attached to a stationary portion of the mirco-mirror array. Flexibly attached to the hinge, the suspended member is attracted to an electrode upon application of an electrical force and restored to an original position by a restoring force. In this manner, the array of micro-mirrors can be tilted in relation to a light source. In some applications, it is beneficial to have the hinge located beneath the micro-mirror surface in a hidden position, enabling the fill factor of the array to be increased. As the fill factor of the micro-mirror array is increased, the potential quality of two-dimensional images created by optical systems using the array is improved.

As merely an example, conventional MEMS have utilized various micro-mirror designs to hide the hinge in a location behind the mirror surface. For example, torsion spring hinges attached to the backside of the mirror surface have been used in some designs. Unfortunately, these techniques also have limitations. For example, some torsion spring designs are difficult to manufacture owing to their complex structural features. Moreover, complex mechanical structures may have reliability and lifetime concerns. Therefore, there is a need in the art for methods and apparatus for a high fill factor micro-electromechanical mirror array with a flexible, hidden support member.

SUMMARY OF THE INVENTION

This present invention relates generally to manufacturing objects. More particularly, the invention provides a method and apparatus for fabricating and operating electro-mechanical systems. Merely by way of example, the invention has been applied to a high fill factor micro-electromechanical mirror array with a hidden, flexible support pedestal. The method and apparatus can be applied to other electro-mechanical technology as well, including actuators and sensors.

In a specific embodiment, the present invention provides an electro-mechanical system. The system has a substrate (e.g., silicon) comprising a surface region. The system has a flexible member comprising a first end coupled to the surface region of the substrate. Preferably, the flexible member comprises a second end and a length defined between the first end and the second end. A base region is within a first portion of the flexible member. The base region is defined from the first end to a first predetermined portion of the length of the flexible member. The base region is characterized by at least a first cross-sectional area, which is parallel to the surface region of the substrate. The system has a tip region within a second portion of the flexible member. The tip region is defined from the second end to a second predetermined portion of the length of the flexible member. The tip region is characterized by at least a second cross-sectional area, which is parallel to the surface region of the substrate. A reflective member is coupled to the flexible member. The reflective member comprises a reflective surface and a backside region. Preferably, the backside region is coupled to the second end of the flexible member. The reflective surface is substantially parallel to the surface region while the reflective member is in a first state and is substantially non-parallel to the surface region while the reflective member is in a second state. The flexible member moves from a first position characterized by the first state to a second position characterized by the second state. The movement of the flexible member from the first position to the second position is constrained to lie in a first plane defined by an axis parallel to the length of the flexible member and an axis parallel to the surface region.

In an alternative specific embodiment, the present invention provides an alternative electro-mechanical system. The system has a first substrate comprising a surface region. A plurality of electrically activated electrodes is coupled to the surface region of the first substrate. The plurality of electrically activated electrodes is coupled to an electrical source to receive a first electrical signal. The system has a plurality of flexible members comprising a first end coupled to the surface region of the first substrate. The members comprises a second end and a length defined between the first end and the second end. A base region is within a first portion of the plurality of flexible members. The base region is defined from the first end to a first predetermined portion of the length of the flexible members. The base region is characterized by at least a first cross-sectional area, which is parallel to the surface region of the substrate. A tip region is within a second portion of the plurality of flexible members. The tip region is defined from the second end to a second predetermined portion of the length of the flexible members. The tip region is characterized by at least a second cross-sectional area. A moveable structure is coupled to the plurality of flexible members, comprising a frontside surface and a backside surface. The backside surface is coupled to the second end of the plurality of flexible members. The frontside surface is substantially parallel to the surface region while the moveable structure is in a first state and is substantially non-parallel to the surface region while the moveable structure is in a second state. The tip region of the plurality of flexible members moves from a first position characterized by the first state to a second position characterized by the second state upon application of a predetermined voltage bias associated with the first electrical signal. The movement of the tip region of the plurality of flexible members from the first position to the second position is constrained to lie in a plane including an axis parallel to the length of the plurality of flexible members.

In an alternative specific embodiment, the present invention provides a method of manufacturing an electro-mechanical system. The method includes depositing a first mask layer on a first surface of a handling substrate and etching the first surface of the handling substrate to form a plurality of flexible pedestals and a plurality of walls. The method includes removing the first mask layer and forming a plurality of electrodes on an electrode substrate. The method includes aligning the handling substrate and the electrode substrate and wafer bonding the handling substrate to the electrode substrate by making contact between the plurality of flexible pedestals and the plurality of walls. The method includes thinning a portion of the handling substrate by removing material from a second surface of the handling substrate and depositing a second mask layer on the second surface of the handling substrate. The method includes etching the second surface of the handling substrate to remove at least a portion of the plurality of walls and form moveable structures.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides a simple structure with fewer process steps, higher yields, reliability, and other desirable features in certain embodiments. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

Figure 1:
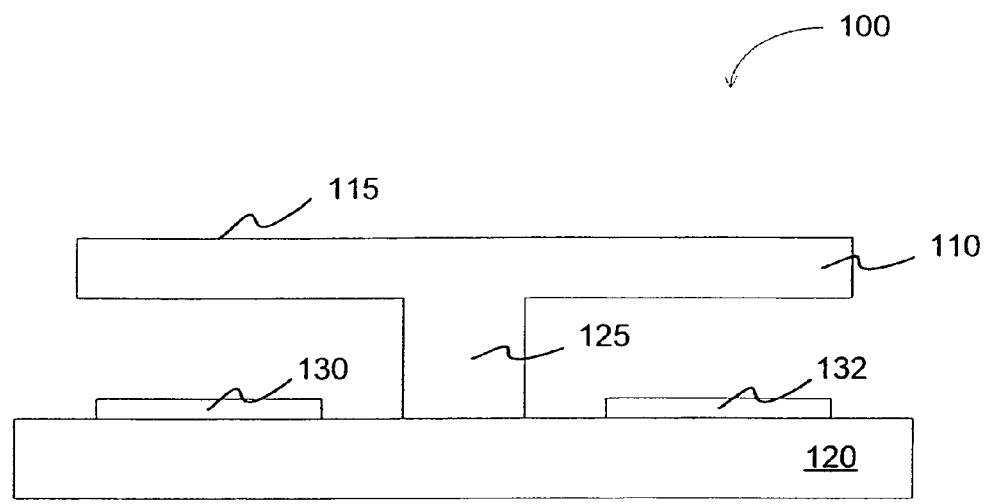
FIG. 1 is a simplified schematic side view of a micro-electromechanical system with a flexible pedestal according to an embodiment of the present invention.

FIG. 1 is a simplified schematic side view of a micro-electromechanical system with a flexible pedestal according to an embodiment of the present invention. A first surface 120 is provided with at least one electrically activated electrode 130 coupled to the first surface. The first surface can be made of any suitable material. The suitable material generally has mechanical stability and an ability to be processed using semiconductor processing techniques. As merely an example, the material can be a semiconductor. Preferably, the first surface is made from a single crystal silicon wafer, processed according to semiconductor processing techniques. In one embodiment, the first surface includes a plurality of control electronics and other integrated circuits formed using semiconductor processing techniques. Other materials may also be used in alternative embodiments according to the present invention.

Electrically activated electrodes 130 and 132 are coupled to the first surface. The electrodes can be made of materials that conduct electricity. Merely by way of example, the electrode 130 in the embodiment illustrated in FIG. 1 is made of a metal preferentially deposited on the first surface. Preferably, the electrode is made of a deposited aluminum layer. In alternative embodiments according to the present invention, the electrode is made of titanium nitride, tungsten, or other suitable conductors.

Moveable structure 110 is suspended at a predetermined position by flexible pedestal 125, which is coupled to the first surface. In the embodiment illustrated in FIG. 1, a portion of the upper surface 115 of the moveable structure is a reflective surface. For example, the power reflectance of portions of upper surface 115 may be greater than or equal to 90%. In alternative embodiments, the moveable member is coated with thin-film coatings to increase the power reflectance of portions of the upper surface. For example, multi-layer stacks of thin film dielectric materials are utilized in a particular embodiment.

Moreover, in embodiments according to the present invention, the flexible pedestal is fabricated from a material with suitable pliability and reliability. The material should be elastic enough to enable the moveable member to be tilted as desired. At the same time, the material should have the ability to be cycled numerous times while still maintaining the desired reliability. In a specific embodiment, the flexible pedestal is fabricated from single crystal silicon, but this is not required by the present invention. Additionally, the moveable member is fabricated from single crystal silicon in a particular embodiment. Alternative embodiments according to the present invention use other materials that bend in response to applied forces and subsequently return to their original shape after removal of such applied forces. For example, some embodiments use polysilicon or metal as the material for the flexible pedestal.

Figure 2:
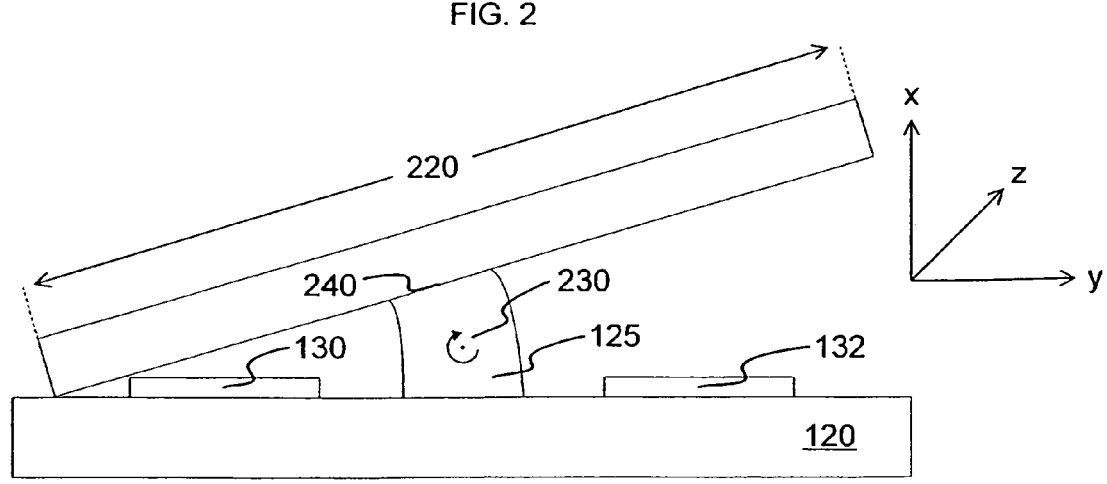
FIG. 2 is a simplified schematic side view of a micro-electromechanical system with a flexible pedestal in an activated state, according to an embodiment of the present invention.

FIG. 2 is a simplified schematic side view of a micro-electromechanical system with a flexible pedestal in an activated state, according to an embodiment of the present invention. As illustrated in this figure, a voltage $V_A$ has been applied to the electrode 130, deflecting the left side of the moveable structure down toward the electrode 130 and creating a restoring torque 230 in the flexible pedestal. In one embodiment, the position of the moveable structure illustrated in FIG. 2 is referred to as an activated state. In an alternative embodiment, a voltage $-V_A$ is applied to electrode 132 resulting in a repulsive force between the right side of the moveable structure and electrode 132. Application of the voltage $-V_A$ also creates a restoring torque 230 in the flexible pedestal. In yet another alternative embodiment, voltages $-V_A$ and $V_A$ are applied to electrodes 130 and 132, respectively, resulting in a repulsive force between the left side of the moveable structure and electrode 130 and an attractive force between electrode 132. Thus deflecting the right side of the moveable structure down toward electrode 132 and producing the opposite tilt angle.

Embodiments according to the present invention utilize a flexible pedestal design in which the flexible pedestal bends in a predetermined manner, without rotating about the longitudinal axis of the pedestal. In general, the upper end or tip 240 of the flexible pedestal is free to move in directions that contain components in both the x-y and x-z planes. In specific embodiments of the present invention, the motion of the upper end 240 of the flexible pedestal is constrained to move in a single plane. Thus, as illustrated in FIG. 2, the flexible pedestal bends in the plane defined by the normal to the first surface 120 (the y-axis) and the axis lying in the plane of the paper that is perpendicular to the normal (the x-axis), namely, the x-y plane. Consequently, the torque 230 is orthogonal to the x-y plane. In the embodiment illustrated in FIG. 2, there is no motion of the tip of the flexible pedestal in the x-z plane and no rotational motion around the z-axis, resulting in the bending motion of the flexible pedestal being constrained to lie in only the x-y plane.

As illustrated in FIG. 2, the left side of the moveable structure makes contact with the first surface 120. However, this is not required by the present invention. An example of one way of utilizing landing pads and landing posts to reduce the amount and impact of contact between the moveable structure and the first surface is described in U.S. patent application Ser. No. 10/718,482, filed Nov. 19, 2003, commonly owned, and hereby incorporated by reference for all purposes. Moreover, in alternative embodiments, the electrodes may be elevated above the first surface, reducing the distance between the electrodes and the moveable surface, and thereby increasing the electrostatic forces resulting from the application of voltages to the electrodes.

In embodiments according to the present invention, the height and position of the flexible pedestal are selected so that the upper surface of the moveable structure is tilted at a predetermined angle with respect to the horizontal when the moveable structure is in the activated state. In embodiments according to the present invention in which the upper surface of the moveable structure comprises reflective portions, an incident ray of light will be reflected at predetermined angles depending on the tilt angle of the moveable structure when in the activated position. In the embodiment illustrated in FIG. 2, the dimensions of the moveable structure and the height and position of the flexible pedestal are selected so that the moveable structure is tilted at an angle of 12° with respect to the horizontal when in the activated state. Alternative embodiments have either increased or decreased tilt angles with respect to the horizontal.

Moreover, in embodiments according to the present invention, the longitudinal length of the moveable structure is a predetermined length. In the embodiment illustrated in FIG. 2, the longitudinal length 220 is 15 µm. Alternatively, the length ranges from a few microns to several hundred microns in other embodiments. Of course, the longitudinal length of the moveable structure will depend on the particular applications. In the embodiment according to the present invention illustrated in FIG. 2, the electrode 130 is complemented by electrode 132 located on the opposite side of the flexible pedestal. These complementary electrodes are used in one embodiment to alternately attract or repel the moveable structure, producing tilting to the left or to the right. In alternative embodiments, a single electrode or more than two electrodes are utilized.

FIGS. 3A–3J and FIG. 3K illustrate a simplified schematic process flow and flowchart, respectively, of a method of fabricating a micro-electromechanical system according to an embodiment of the present invention. As illustrated in the figures, the process employs two substrates which are processed separately, subsequently bonded together to form a composite structure, and processed further as a composite structure. In alternative embodiments, the micro-electromechanical system is fabricated by sequentially depositing and processing layers on a single substrate. In FIGS. 3A–3J, the figures as drawn are truncated on the left and rights sides of the figures for purposes of clarity.

Figure 3A:
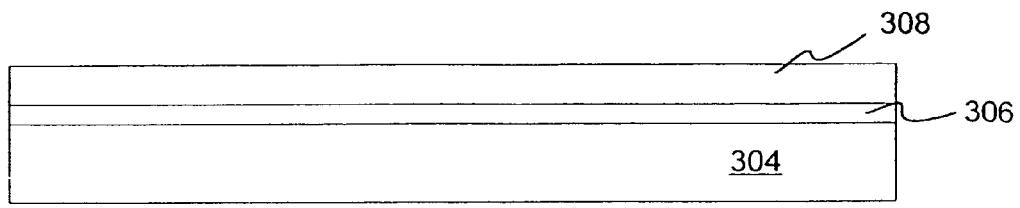
FIGS. 3A–3J illustrate a simplified schematic process flow of a method of fabricating a micro-electromechanical system according to an embodiment of the present invention.
Figure 3B:
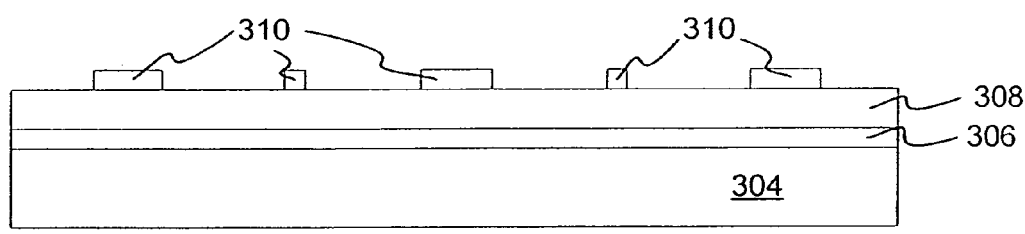
Figure 3C:
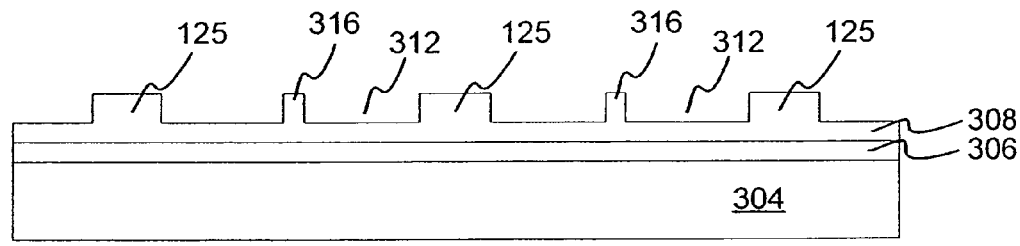

FIG. 3A illustrates a handling substrate 304 with an insulating layer 306 and device layer 308. The handling substrate is fabricated from a suitable material. In one embodiment, the handling substrate is a single crystal silicon wafer, but this is not required by the present invention. The insulating layer 306 is a silicon oxide layer in an embodiment according to the present invention. In alternative embodiments, the insulating layer comprises a silicon nitride layer or a composite oxide/nitride layer. In step 380 of FIG. 3K, a mask layer 310 is deposited on top of device layer 308 as illustrated in FIG. 3B. In one embodiment according to the present invention, silicon oxide is deposited and patterned to form the mask layer. Standard photolithography techniques can be used to generate the mask layer. The mask layer is typically characterized by a two-dimensional pattern in the plane of the handling substrate. The mask layer defines regions of the device layer that will be etched during a subsequent etching process or series of etching processes, forming cavities or recessed regions 312 in the device layer along with flexible pedestals 125 and walls 316.

In step 382, the device layer is etched to form the flexible pedestals 125 and the walls 316 in an upper portion of the device layer 308. In alternative embodiments, the flexible pedestals and the walls are formed in subsequent etching processes, thereby optimizing the shape of the pedestals and the shape of the walls independently. Additional masking steps are utilized as needed for each of the additional etching processes. The etch processes utilized, as discussed below, will form flexible pedestals and walls with predetermined profiles and heights.

In one embodiment, the substrate is etched in a reactive ion etch chamber flowing with $SF_6$, HBr, and oxygen gases at flow rates of 100 sccm, 50 sccm, and 10 sccm respectively. The operating pressure is in the range of 10 to 50 mTorr, the bias power is 60 W, and the source power is 300 W. In another embodiment, the substrate is etched in a reactive ion etch chamber flowing with $Cl_2$, HBr, and oxygen gases at flow rates of 100 sccm, 50 sccm, and 10 sccm, respectively. In these embodiments, the etch processes stop when the cavities are about 3–4 microns deep. This depth is measured using in-situ etch depth monitoring, such as in-situ optical interferometer techniques, or by timing the etch rate.

In another embodiment, the cavities are formed in the substrate by an anisotropic reactive ion etch process. The substrate is placed in a reaction chamber. $SF_6$, HBr, and oxygen gases are introduced into the reaction chamber at a total flow rate of 100 sccm, 50 sccm, and 20 sccm, respectively. A bias power setting of 50 W and a source power of 150 W are used at a pressure of 50 mTorr for approximately 5 minutes. The substrate is then cooled with a backside helium gas flow of 20 sccm at a pressure of 1 mTorr. In one particular embodiment, the etch processes stop when the cavities are about 3–4 microns deep. This depth is measured using in-situ etch depth monitoring, such as in-situ optical interferometer techniques, or by timing the etch rate. The mask layer is removed in step 384.

Figure 3D:
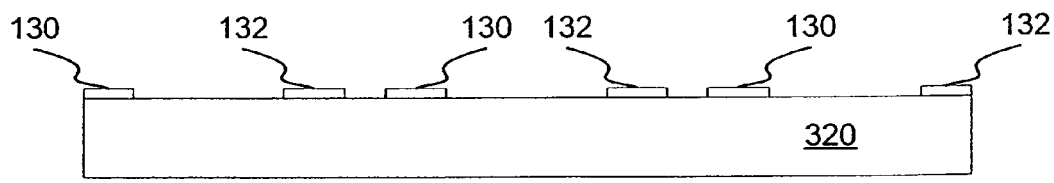

FIG. 3D illustrates a simplified cross-sectional view of an electrode substrate according to an embodiment of the present invention. Substrate 320 is processed according to well-known semiconductor processing techniques to form electrodes 130 and 132 and control electronics (not shown) on the surface of substrate 320. Substrate 320 is a transparent material in one embodiment of the present invention.

Merely by way of example, in one embodiment, the substrate is quartz and the electrodes and control transistors are fabricated from polysilicon, oxides, and metals. In additional embodiments, an array of memory cells, row address circuitry, and column data loading circuitry are formed on the electrode substrate. The methods of forming this electrical circuitry are well know in the art. For example, DRAM, SRAM, and latch devices are commonly known and may perform addressing functions. A passivation layer such as silicon oxide or silicon nitride is deposited over the control transistors in one embodiment according to the present invention, selectively separating the control transistors from metallized electrodes.

In embodiments according to the present invention in which the spacing between flexible pedestals and the walls is relatively large on semiconductor scales (for example, a spacing of 15 µm), complex electrical circuitry can be manufactured on the surface of the electrode substrate in the regions between the flexible pedestals. Possible circuitry includes, but is not limited to, storage buffers to store time sequential pixel information, circuitry to compensate for possible non-uniformity of the handling and electrode substrates or their deposited layers, and circuitry to form pulse width modulation conversions.

Figure 3E:
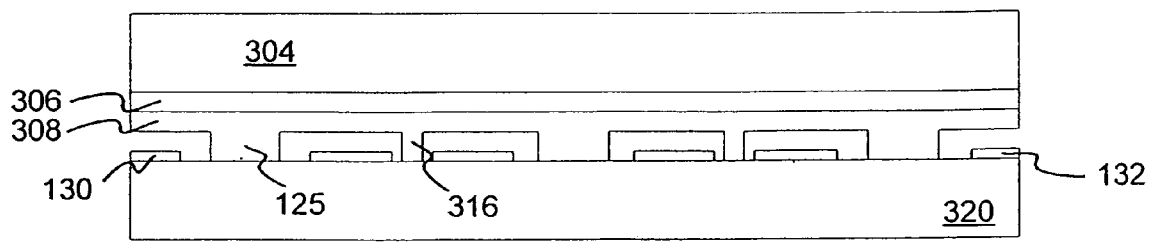

In step 388, the handling substrate and the electrode substrate are bonded together as illustrated in FIG. 3E. In FIG. 3E, the handling substrate has been inverted and bonded to the top of the electrode substrate. As illustrated in FIG. 3E, the substrates have been aligned so that the flexible pedestals 125 are positioned an equal distance between electrodes 130 and 132. Additionally, the walls 316 are positioned an equal distance between electrodes 132 and 130. In one embodiment, the substrates are optically aligned using double focusing microscopes. In this embodiment, alignment marks located on both substrates are utilized to position the substrates during the alignment process. In another embodiment, the substrates are bonded together using low temperature bonding methods such as anodic or eutectic bonding. In alternative embodiments, other bonding methods are employed, for example, the use of thermoplastics or dielectric spin glass bonding materials. After bonding, the handling substrate is bonded to the electrode substrate at the locations where the flexible pedestals and the walls make contact with the electrode substrate.

Figure 3F:
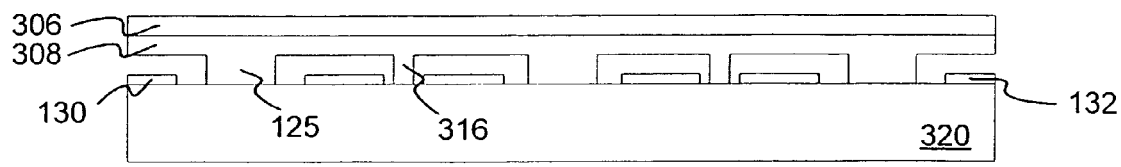
Figure 3G:
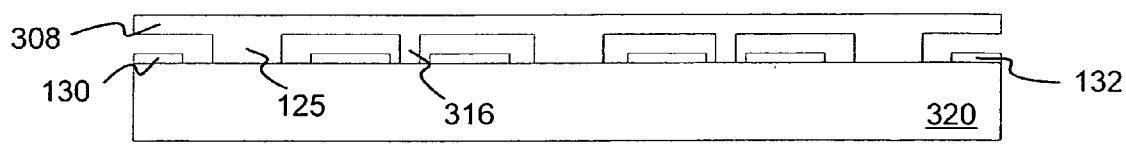

In step 390, illustrated in FIG. 3F, the handling substrate is removed using a thinning process. For example, in one embodiment, the handling substrate is removed in a lapping apparatus that employs mechanical polishing and grinding to remove layer 304. In step 392, insulating layer 306 is removed as illustrated in FIG. 3G. Merely by way of example, the insulating layer is removed in one embodiment by chemical etching. In alternative embodiment, the insulating layer is removed by mechanical grinding or polishing.

Subsequent to the removal of the oxide layer, in a particular embodiment according to the present invention, the device layer 308 is polished. In alternative embodiments, the device layer is thinned to a predetermined thickness and subsequently polished, however this is not required by the present invention. In yet another alternative embodiment, the thickness of the device layer 308 is selected during the initial fabrication of handling substrate 304 and is maintained at this pre-selected thickness during subsequent processing. In this alternative embodiment, the surface morphology of layer 308/layer 306 interface is controlled during the initial fabrication of the handling substrate and no thinning or polishing steps are needed. As will be apparent in FIG. 3I, the thickness of the device layer 308 will impact the thickness of the upper portion of the moveable structure. In an embodiment in which the moveable structure functions as a micro-mirror, the thickness of the mirror is dependent on the thickness of device layer 308.

Figure 3H:
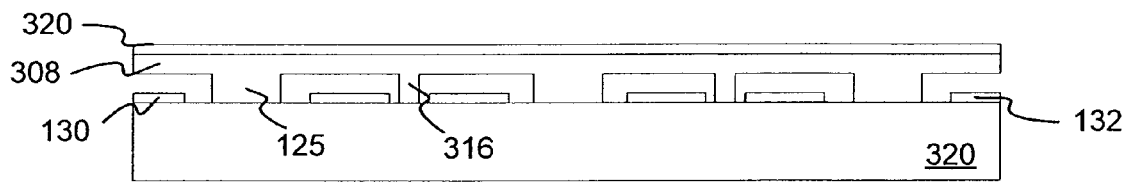

In step 394 a reflective surface 320 is formed at the top surface of layer 308. As illustrated in FIG. 3H, a reflective layer is deposited on top of layer 308, but this is not required by the present invention. In one embodiment, the layer 308 is polished to create a reflective surface. In an alternative embodiment, at least one layer of reflective material is deposited on top of layer 308. Merely by way of example, the reflective material can be a metallic reflective layer, such as aluminum. In the embodiment with an aluminum reflective layer, the layer 308 is first coated with approximately 10 nm of a titanium seed thin film. An aluminum layer approximately 30 nm thick is then deposited on the titanium seed layer. In this embodiment, a reflectance of over 90% is achieved over a significant portion of the visible spectrum. In alternative embodiments, multi-layer dielectric stacks are utilized to form reflective surface 320. The multi-layer dielectric stacks in one embodiment are designed to provide a reflectance of over 99% over a significant portion of the visible spectrum. Alternatively, the reflectance ranges from about 80% to about 99.1% in other embodiments. Of course, the reflectance value will depend on the particular applications.

Figure 3I:
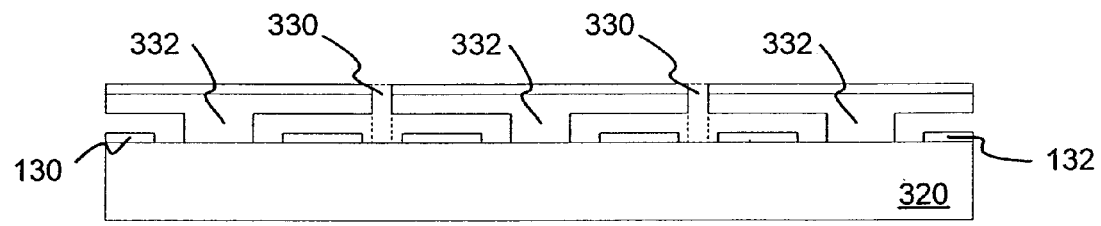
Figure 3J:
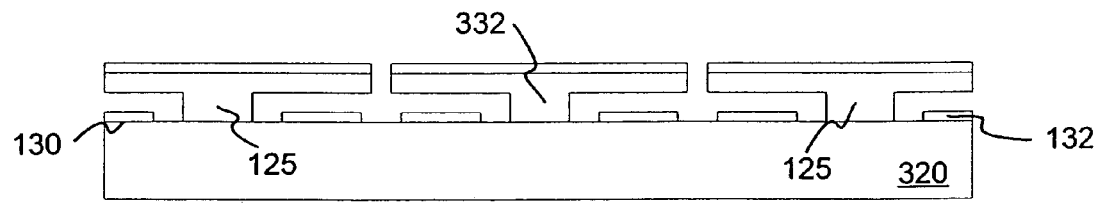
Figure 3K:
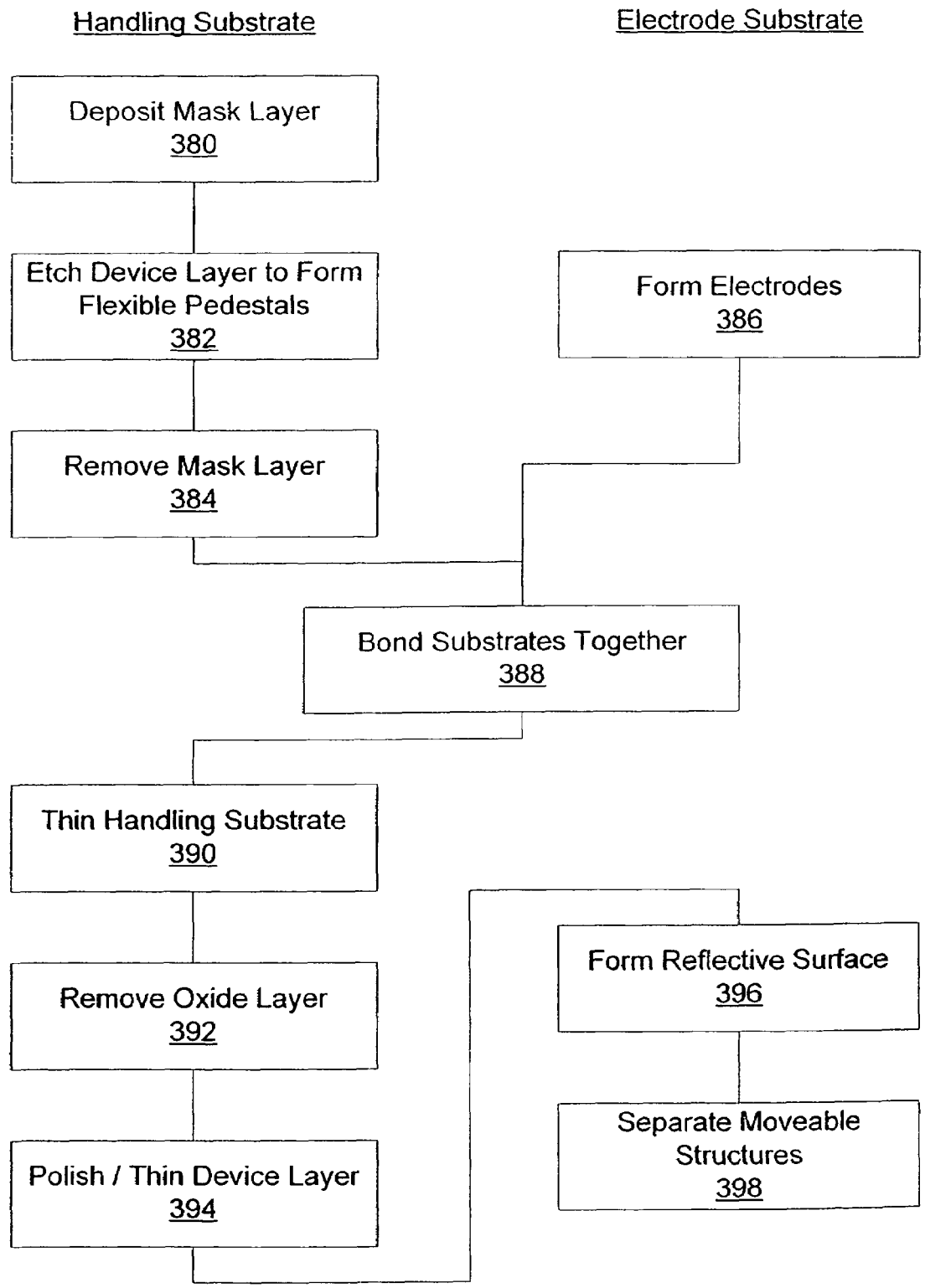
FIG. 3K is a simplified schematic flowchart of a method of fabricating a micro-electromechanical system according to an embodiment of the present invention.

In step 396, the moveable structures 332 are separated from adjacent structures by an etching process as illustrated in FIG. 3I. Typically, a mask layer (not shown) is deposited to top of the reflective surface 320 and used during an etching process that removes portions of layer 320, 308, and the walls 316 in areas 330, illustrated by a dashed line in FIG. 3I. After the etching process is completed, the mask layer (not shown) is removed and the structure illustrated in FIG. 3J is produced. Adjacent moveable structures 332 are supported by flexible pedestals 125 and are located above corresponding electrodes 130 and 132.

Figure 4A:
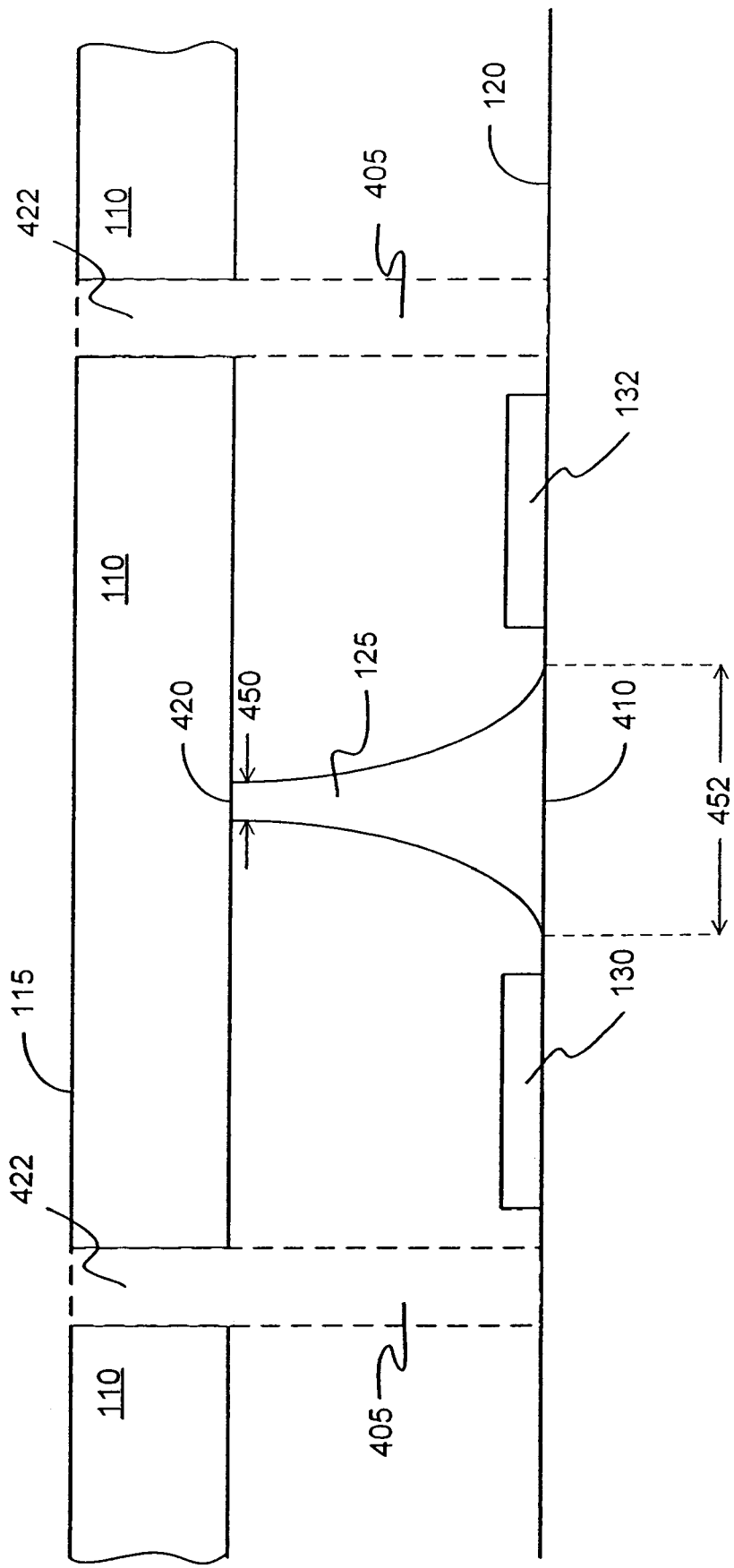
FIG. 4A is a simplified schematic side view of a micro-electromechanical system with a non-uniform cross-sectional area pedestal according to an alternative embodiment of the present invention.
Figure 4B:
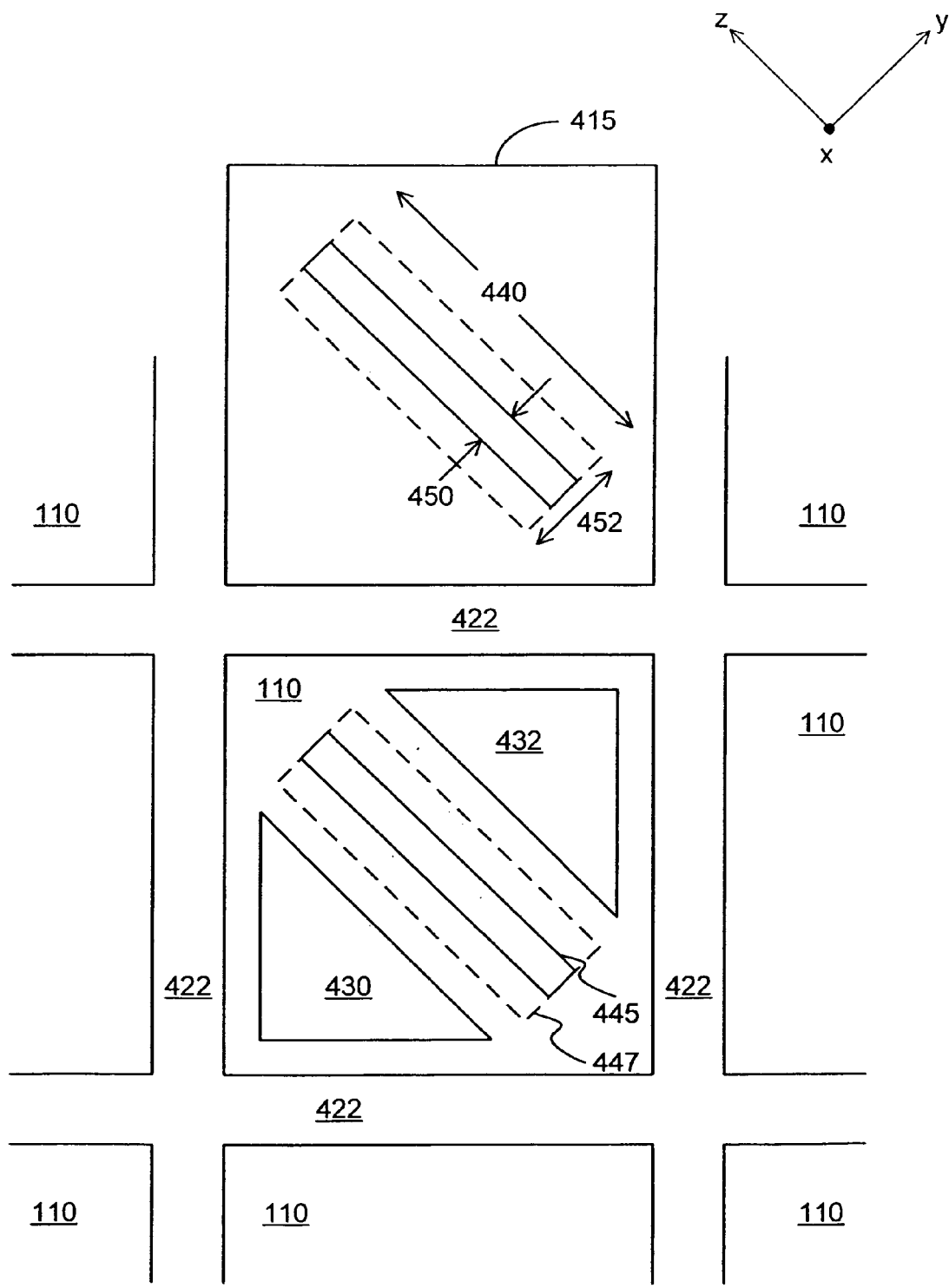
FIG. 4B is a simplified schematic top view of a micro-electromechanical system with a non-uniform cross-sectional area pedestal according to an alternative embodiment of the present invention.

The dimensions of the flexible pedestal will impact its elasticity and the force required to modulate the position of the moveable structure. For many materials used to fabricate the flexible pedestal, a smaller cross-sectional area will result in increased flexibility. At the same time, a decrease in the cross-sectional area of the pedestal's base will increase the difficulty of reliably bonding the base of the flexible pedestal to the first surface, as described above. Thus, there is, in some embodiments, a tradeoff between pedestal flexibility and ease of manufacturing. FIGS. 4A and 4B are simplified schematic side and top views, respectively, of a MEMS with a flexible pedestal characterized by a non-uniform cross-sectional area according to an alternative embodiment of the present invention. Moreover, in some embodiments, a tradeoff also exists between the ease of bonding the walls to the electrode substrate and increasing the fill factor of the array of moveable structures. As the width of the walls, which provide structural support during fabrication, decrease, possible manufacturing difficulties during the bonding process increase. Counterbalancing this effect, as the wall width increases, the fill factor of the moveable structures after the walls are removed, is decreased. In embodiments of the present invention, the wall width is a predetermined value. In a particular embodiment, the wall width is 0.6 µm and uniform throughout the handling substrate. Alternatively, the width ranges from about 0.2 µm to about 1 µm in other embodiments. Of course, the width will depend upon the particular applications.

FIG. 4B is a simplified schematic top view of a MEMS with a non-uniform cross-sectional area pedestal according to an alternative embodiment of the present invention. The perimeter of the reflective surface 115 of the moveable member 110 is illustrated as rectangle 415 in this figure. Electrodes 130 and 132, not visible from the top, but illustrated for purposes of clarity, are illustrated as triangular areas 430 and 432. The base region of the flexible pedestal, coupled to the first surface at location 410 in FIG. 4A, is illustrated as dashed rectangle 447 in FIG. 4B. The base or first end of the pedestal 410 is characterized by at least a first cross-sectional area defined by a first width (dimension 452 in FIG. 4B) and a first length (dimension 440 in FIG. 4B). As illustrated in FIG. 4B, the first width is less than the first length.

The top region or tip of the flexible pedestal, coupled to the lower surface of moveable structure 110 at location 420 in FIG. 4A, is illustrated as solid rectangle 445 in FIG. 4B. Thus, the dimensions of the pedestal at its tip or second end is width 450 and length 440. The second end of the pedestal 420 is characterized by at least a second cross-sectional area defined by a second width (dimension 450 in FIG. 4B) and a second length (dimension 440 in FIG. 4B). As illustrated in FIG. 4B, the second width is less than the second length. Moreover, the cross-sectional area 447 of the base or first region of the flexible pedestal is greater than cross-sectional area 445 of the tip or second region of the flexible pedestal. The distance from the first end of the pedestal to the second end defines a length of the pedestal. In FIG. 4B, this length lies along the longitudinal axis of the pedestal, parallel to the x-axis.

The cross-sectional profile illustrated in FIG. 4A can be manufactured utilizing various semiconductor etch processes well known to one of skill in the art. For example, an isotropic etch is utilized in a specific embodiment to create the cross-sectional profile illustrated in FIG. 4A.

Moreover, as illustrated in FIGS. 4A and 4B the cross-sectional shape of the flexible pedestal is rectangular with the cross-sectional area varying as a function of the pedestal length. However, in other embodiments according to the present invention, the flexible pedestal is characterized by different cross-sectional shapes. For example, flexible pedestals in the shape of a circle, oval, diamond, and other geometric shapes are utilized in alternative embodiments. Of course, the degrees of freedom associated with the bending motion of the flexible pedestal will depend on the particular cross-sectional shape. For example, as illustrated in FIGS. 4A and 4B, the pedestal will be constrained to bend in a predetermined manner. As illustrated, the first end of the pedestal is substantially fixed, as it is bonded to the first surface. However, the second end of the pedestal is capable of moving in the plane defined by the longitudinal axis of the pedestal and the width of the pedestal (the x-y plane). The rigidity produced by the length 440 of the pedestal in comparison with the width, and the placement of the electrodes along a line parallel to the width of the pedestal and passing through the center of the pedestal, result in the tip of the pedestal only moving in the x-y plane, resulting in the pedestal only bending in the x-y plane. A rotational torque orthogonal to the x-y plane (about the z-axis) will thus be present in the flexible pedestal when it is positioned in the second or activated position. As described, the tip of the pedestal is substantially fixed in the x-z plane due to the pedestal shape and electrode placement. Moreover, the pedestal does not experience any rotational bending around its longitudinal axis (x-axis) when positioned in the second position.

In embodiments in which the cross-sectional shape of the pedestal is an ellipse, the bending motion will occur in the plane defined by the longitudinal axis of the pedestal and the minor axis of the ellipse, rotating about the axis parallel to the major axis of the ellipse. Embodiments in which the cross-sectional shape of the pedestal is a combination of such geometrical shapes, and the resulting constraints on the bending motion, will be apparent to those of skill in the art.

FIG. 4B is a simplified schematic top view of a MEMS with a non-uniform cross-sectional area pedestal according to an alternative embodiment of the present invention. The perimeter of the reflective surface 115 of the moveable member 110 is illustrated as rectangle 415 in this figure. Electrodes 130 and 132, not visible from the top, but illustrated for purposes of clarity, are illustrated as triangular areas 430 and 432. The base of the flexible pedestal, coupled to the first surface at location 410 in FIG. 4A, is illustrated as dashed rectangle 447 in FIG. 4B. The dimensions of the pedestal at its base is width 452 and length 440. The top of the flexible pedestal, coupled to the moveable structure at location 420 in FIG. 4A, is illustrated as solid rectangle 445 in FIG. 4B. Thus, the dimensions of the pedestal at its top is width 450 and length 440. As illustrated, the cross-sectional area 447 is greater than cross-sectional area 445.

The flexible pedestal illustrated in FIGS. 4A and 4B provides an embodiment according to the present invention in which the elasticity of the pedestal is increased by the narrowing of the cross-section as a function of height while still maintaining the width of the pedestal's base at location 410, thereby reducing possible manufacturing difficulties. Although the embodiment illustrated in FIG. 4A utilizes a flexible pedestal in which the cross-sectional are decreases monotonically from the base to the top, this is not required by the present invention. Alternative embodiments utilize flexible pedestals of non-uniform cross-section in which the cross-sectional area varies in other continuous and discontinuous manners.

In embodiments according to the present invention, the length 440 of the flexible pedestal is a predetermined distance. In a specific embodiment, the length of the flexible pedestal is 3 µm and uniform along the length of the pedestal. In other embodiments, the length varies along the length of the pedestal. As discussed above, for many materials, the dimensions of the pedestal, including the length, impact the flexibility of the pedestal. For example, in some embodiments, as the length of the pedestal increases, the flexibility typically decreases. Increases in pedestal length are balanced against decreases in width in some embodiments to maintain the flexibility at a desired value. In designing the pedestal dimensions, including the width and length, the designer can utilize these design parameters to optimize the system performance. In one embodiment, the flexible pedestal runs continuously from one corner of the moveable structure to the opposite corner. As illustrated in FIG. 4B, the length 440 of the pedestal in this embodiment would be $\sqrt{2}$ times the length of a side of the moveable structure 415.

As illustrated in FIGS. 4A and 4B, moveable structures 110 are laid out in the pattern of a two-dimensional array. In a specific embodiment, the moveable structures form a two-dimensional micro-mirror array. As described with relation to FIG. 3E, the walls 316, which form a continuous two dimensional array of rows and columns in areas 422 as illustrated in FIG. 4B, and the pedestals 125 are bonded to the first surface 120 during the bonding process. After the two substrates are bonded together, the walls 316 are removed, separating adjacent micro-mirrors from each other by spaces 422. As illustrated by the dashed lines in FIG. 4A, the entire wall 316 is removed during this process, leaving gaps 422 between adjacent mirrors. After removal of the walls, the flexible pedestals 125 support the moveable structures 110.

In embodiments according to the present invention, the dimensions of the flexible pedestal are selected to achieve particular system goals. For example, in one embodiment, the length and width of the flexible pedestal are predetermined. As will be evident to one of skill in the art, the elasticity of the flexible pedestal will typically be a function of the pedestal dimensions. For example, as the length and width of the pedestal increases, the elasticity of the pedestal typically decreases. In a specific embodiment, the length of the pedestal is 3 μm and the width of the pedestal is 0.2 μm. In this specific embodiment, the length and width of the pedestal is uniform as a function of height. In the embodiment illustrated in FIGS. 4A and 4B, the length of the pedestal is 0.2 μm and uniform as a function of height. However, as illustrated in FIGS. 4A and 4B, the width of the pedestal is non-uniform as a function of height. As illustrated in FIGS. 4A and 4B, the width of the pedestal is 0.3 μm at the base (dimension 452) and 0.1 μm at the top (dimension 450).

In another specific embodiment, the length of the pedestal is increased to improve the reliability of the bond between the base of the pedestal and the first surface. In an alternative specific embodiment, the width of the base of the pedestal is increased to improve the reliability of the bond between the base of the pedestal and the first surface. In yet another alternative embodiment, the length and average width of the pedestal are increased to improve the reliability of the bond between the base of the pedestal and the first surface.

Figure 5:
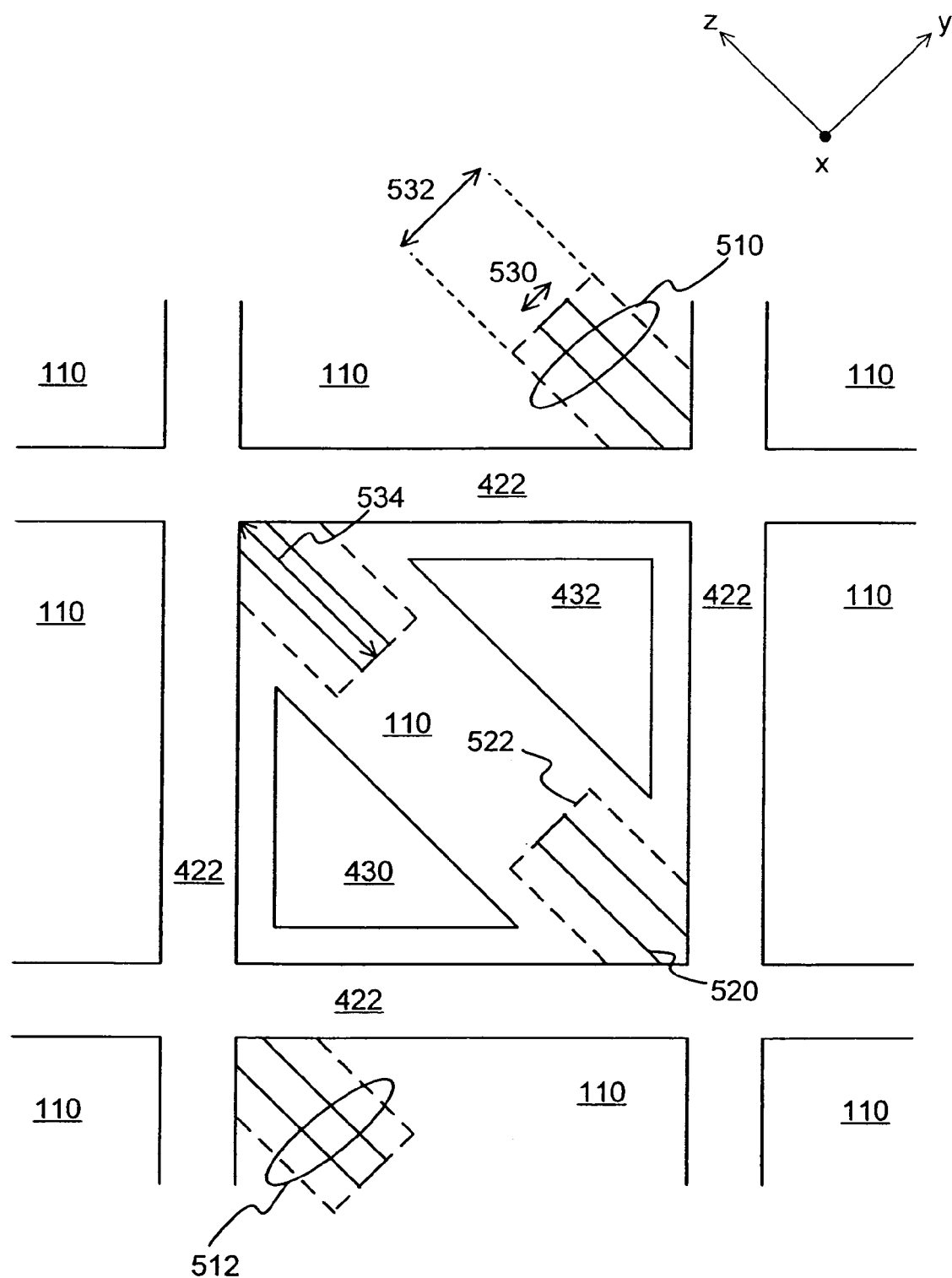
FIG. 5 is a simplified schematic top view illustration of an alternative embodiment of a micro-electromechanical system according to the present invention.

FIG. 5 is a simplified schematic top view illustration of an alternative embodiment according to the present invention. FIG. 5 illustrates the micro-electromechanical array of this embodiment after the bonding and wall removal process is completed as described in relation to FIG. 4A As shown in FIG. 5, two flexible pedestals 510 and 512 support each corner of each moveable structure 110.

In embodiments according to the present invention, the dimensions of the flexible pedestals are selected to achieve particular system goals. For example, in one embodiment, the lengths and widths of the flexible pedestals are predetermined. As illustrated in FIG. 5, a first pedestal 510 is coupled to a first corner of the moveable structure 110 and a second flexible pedestal 512 is coupled to a second corner of the moveable structure. In the embodiment illustrated in FIG. 5, the first corner and the second corner are opposite each other. The pedestals 510 and 512 have a non-uniform cross-section as a function of height. The width at the base 522 (represented by a dashed line) is larger than the width at the top 520 (represented by a solid line). For example, in the embodiment illustrated in FIG. 5, pedestals 510 and 512 have a length (dimension 534) of 2 μm, a base width (dimension 530) of 0.3 μm, and a top width (dimension 532) of 0.1 μm. In alternative embodiments, the cross-sectional area of the flexible pedestal does not monotonically decrease as a function of the distance from the first surface (height measured from the base to the top). Alternative embodiments utilize flexible pedestals of non-uniform cross-section in which the cross-sectional area varies in other continuous and discontinuous manners.

In the embodiment illustrated in FIG. 5, the two pedestals supporting the moveable structure are equal in dimensions, resulting in a symmetric structure. However, this is not required by the present invention. Alternative embodiments according to the present invention utilize pedestals of varying length and width. Moreover, in yet other alternative embodiments, the number of pedestals per moveable structure is greater than two. For example, one specific embodiment utilizes three pedestals, with two pedestals located at the first and second (opposite) corners of the moveable structure and the third located near the center of the moveable structure. Additional embodiments utilize additional pedestals to support the moveable structure depending on the particular applications.

As discussed in relation to FIGS. 4A and 4B, the geometry of the cross-sectional area of the pedestal and the placement of the electrodes will constrain the motion of the tips of the flexible pedestals to move in the x-y plane. Therefore, the motion of the moveable structure will be constrained to lie in the x-y plane. No rotational torques about the longitudinal axes of the flexible pedestals (lying parallel to the x-axis) are generated in the embodiment illustrated in FIG. 5 as the restoring torques present in the flexible pedestals are orthogonal to the x-y plane.

The examples and embodiments described herein are for illustrative purposes only. Various modifications or changes in light thereof will be suggested to persons skilled in the art and are to be included within the spirit and purview of this application and scope of the appended claims. It is not intended that the invention be limited, except as indicated by the appended claims.

The invention claimed is:

1. An electro-mechanical system, comprising:
a substrate comprising a surface region;
a flexible member comprising a first end coupled to the surface region of the substrate, the flexible member comprising a second end and a length defined between the first end and the second end;
a base region within a first portion of the flexible member, the base region being defined from the first end to a first predetermined portion of the length of the flexible member, the base region being characterized by at least a first cross-sectional area, the first cross-sectional area being parallel to the surface region of the substrate;
a tip region within a second portion of the flexible member, the tip region being defined from the second end to a second predetermined portion of the length of the flexible member, the tip region being characterized by at least a second cross-sectional area, the second cross-sectional area being parallel to the surface region of the substrate; and
a reflective member coupled to the flexible member, the reflective member comprising a reflective surface and a backside region, the backside region being coupled to the second end of the flexible member, the reflective surface being substantially parallel to the surface region while the reflective member is in a first state and being substantially non-parallel to the surface region while the reflective member is in a second state;
whereupon the flexible member moves from a first position characterized by the first state to a second position characterized by the second state, the movement of the flexible member from the first position to the second position being constrained to lie in a first plane defined by an axis parallel to the length of the flexible member and an axis parallel to the surface region, wherein an angle between the reflective member in the first state and the reflective member in the second state, measured in the first plane, is 12°.

2. The electro-mechanical system of claim 1 wherein a portion of the reflective member has a reflectance greater than 95%.

3. The electro-mechanical system of claim 2 wherein the reflective member comprises a micro-mirror forming a portion of a micro-mirror array.

4. The electro-mechanical system of claim 1 wherein the flexible member and the reflective member are fabricated from single crystal silicon.

5. The electro-mechanical system of claim 1 wherein the movement of the flexible member from the first position to the second position is constrained to lie in the first plane because a first dimension of the flexible member parallel to the axis parallel to the surface region is less than a second dimension of the flexible member orthogonal to the axis parallel to the length of the flexible member and the axis parallel to the surface region.

6. The electro-mechanical system of claim 5 wherein the first dimension is a cross-sectional width of the flexible member and the second dimension is a cross-sectional length of the flexible member, the product of the cross-sectional width and the cross-sectional length being the first cross-sectional area.

7. The electro-mechanical system of claim 6 wherein the cross-sectional length of the flexible member prevents movement of the flexible member in any plane other than the first plane.

8. The electro-mechanical system of claim 6 wherein the movement of the flexible member from the first position to the second position results in a restoring torque purely orthogonal to the first plane.

9. The electro-mechanical system of claim 1 wherein the second cross-sectional area is smaller than the first cross-sectional area.

10. An electro-mechanical system, comprising:
a first substrate comprising a surface region;
a plurality of electrically activated electrodes coupled to the surface region of the first substrate, the plurality of electrically activated electrodes being coupled to an electrical source to receive a first electrical signal;
a plurality of flexible members comprising a first end coupled to the surface region of the first substrate, the members comprising a second end and a length defined between the first end and the second end;
a base region within a first portion of the plurality of flexible members, the base region being defined from the first end to a first predetermined portion of the length of the flexible members, the base region being characterized by at least a first cross-sectional area, the first cross-sectional area being parallel to the surface region of the substrate;
a tip region within a second portion of the plurality of flexible members, the tip region being defined from the second end to a second predetermined portion of the length of the flexible members, the tip region being characterized by at least a second cross-sectional area; and
a moveable structure, coupled to the plurality of flexible members, comprising a frontside surface and a backside surface, the backside surface being coupled to the second end of the plurality of flexible members, the frontside surface being substantially parallel to the surface region while the moveable structure is in a first state and being substantially non-parallel to the surface region while the moveable structure is in a second state;
whereupon the tip region of the plurality of flexible members moves from a first position characterized by the first state to a second position characterized by the second state upon application of a predetermined voltage bias associated with the first electrical signal, the movement of the tip region of the plurality of flexible members from the first position to the second position being constrained to lie in a plane including an axis parallel to the length of the plurality of flexible members, wherein the moveable structure tilts at an angle of 12° with respect to the first surface upon application of the predetermined voltage bias associated with the first electrical signal.

11. The electro-mechanical system of claim 10 wherein the plurality of flexible members comprise a first flexible member coupled to a first corner of the moveable structure and a second flexible member coupled to a second corner of the moveable structure, the second corner located opposite the first corner.

12. The electro-mechanical system of claim 11 wherein the movement of the tip region of the plurality of flexible members from the first position to the second position is constrained to lie in the plane including the axis parallel to the length of the plurality of flexible members because a dimension of the plurality of flexible members parallel to a line running from the first corner of the moveable structure to the second corner of the moveable structure is greater than a dimension of the plurality of flexible members orthogonal to the line and parallel to the surface region.

13. The electro-mechanical system of claim 11 wherein a portion of the frontside surface of the moveable structure is adapted to reflect incident radiation.

14. The electro-mechanical system of claim 13 wherein the portion of the frontside surface of the moveable structure has a reflectance greater than 95%.

15. The electro-mechanical system of claim 14 wherein the moveable structure comprises an element of an array of micro-mirrors.

16. The electro-mechanical system of claim 10 wherein the plurality of flexible members and the moveable structure are fabricated from single crystal silicon.

17. The electro-mechanical system of claim 10 wherein the second cross-sectional area is smaller than the first cross-sectional area.

18. A method of manufacturing an electro-mechanical system, the method, comprising:
depositing a first mask layer on a first surface of a handling substrate;
etching the first surface of the handling substrate to form a plurality of flexible pedestals and a plurality of walls;
removing the first mask layer;
forming a plurality of electrodes on an electrode substrate;
aligning the handling substrate and the electrode substrate;
wafer bonding the handling substrate to the electrode substrate by making contact between the plurality of flexible pedestals and the plurality of walls;
thinning a portion of the handling substrate by removing material from a second surface of the handling substrate;
depositing a second mask layer on the second surface of the handling substrate; and
etching the second surface of the handling substrate to remove at least a portion of the plurality of walls and form moveable structures.

19. The method of claim 18 further comprising polishing the second surface of the handling substrate.

20. The method of claim 18 further comprising depositing at least one reflective layer on the second surface of the handling substrate.

21. The method of claim 20 wherein the reflective layer is characterized by a reflectance value of greater than 90%.

22. The method of claim 18 wherein the flexible pedestals provide mechanical support for the moveable structures.

* * * * *